(12) United States Patent
Cunico et al.

(10) Patent No.: US 10,079,903 B1
(45) Date of Patent: Sep. 18, 2018

(54) PREDICTIVE UNACTIONED MOBILE NOTIFICATION PROCESSING

(71) Applicant: International Business Machines Corporation, Armonk, NY (US)

(72) Inventors: Hernan A. Cunico, Holly Springs, NC (US); Paul A. R. Frank, Berlin (DE); Martin G. Keen, Cary, NC (US); Adam J. Smye-Rumsby, Reading, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/462,104

(22) Filed: Mar. 17, 2017

(51) Int. Cl.
*H04M 3/42* (2006.01)
*H04L 29/08* (2006.01)
*H04W 4/20* (2018.01)

(52) U.S. Cl.
CPC ............. *H04L 67/26* (2013.01); *H04W 4/20* (2013.01)

(58) Field of Classification Search
CPC ....... H04L 51/26; H04L 67/26; H04L 41/026; H04L 51/24; H04L 67/18; H04L 67/22; H04L 12/58; H04L 51/00; H04W 4/003; H04W 4/12; H04W 68/00; H04W 68/005
USPC ...................................................... 455/414.1
See application file for complete search history.

(56) References Cited

U.S. PATENT DOCUMENTS

| | | |
|---|---|---|
| 8,731,523 B1 | 5/2014 | Onnen et al. |
| 8,849,730 B2 | 9/2014 | Winn et al. |
| 2004/0019634 A1* | 1/2004 | Van Geldern .......... G06Q 10/10 709/203 |
| 2004/0128359 A1* | 7/2004 | Horvitz ................ G05B 19/404 709/207 |
| 2013/0047034 A1 | 2/2013 | Salomon et al. |
| 2014/0304363 A1 | 10/2014 | Mhatre et al. |
| 2015/0039704 A1 | 2/2015 | Kursun |
| 2015/0082212 A1* | 3/2015 | Sharda ..................... H04L 67/26 715/764 |
| 2015/0237475 A1* | 8/2015 | Henson ................. H04W 4/021 455/456.3 |
| 2016/0262128 A1 | 9/2016 | Hailpern et al. |
| 2016/0292718 A1* | 10/2016 | Jain ..................... G06Q 30/0246 |
| 2016/0337404 A1* | 11/2016 | Duca ....................... H04L 51/38 |
| 2017/0069046 A1* | 3/2017 | Slipakoff .............. G06Q 50/18 |
| 2017/0099592 A1* | 4/2017 | Loeb ....................... H04W 4/18 |
| 2017/0302609 A1* | 10/2017 | Vardhan ................. H04L 51/24 |

* cited by examiner

Primary Examiner — Timothy Pham
(74) Attorney, Agent, or Firm — Maeve M. Carpenter; Hunter E. Webb; Keohane & D'Alessandro, PLLC (57) ABSTRACT

Aspects of the present invention provide an approach for processing a notification on a mobile device. In an embodiment, a set of classifications is assigned to a notification received by a user on a mobile device. An expected response action and an expected response time specific to the user is derived based on a comparison of the set of classifications assigned to the notification with a set of prior response profiles in a notification tracking repository. If the user does not perform a response action within the expected response time, the notification is reissued to the user.

17 Claims, 6 Drawing Sheets

PREDICTIVE UNACTIONED MOBILE NOTIFICATION PROCESSING

TECHNICAL FIELD

The subject matter of this invention relates generally to communications management. More specifically, aspects of the present invention provide a solution for processing a notification on a mobile device.

BACKGROUND

In the information technology (IT) environment of today, mobile notifications continue to be adopted in ever increasing numbers by mobile app developers. Mobile apps that utilize push notifications typically drive additional engagement. Last year, for example, users who enabled push notifications launched an application (app) an average of 14 times per month. In contrast, users who did not enable push notifications only launched an app five times per month. The common result for mobile users is a growing number of push notifications received on their mobile devices and smart watches.

Some mobile notifications contain content that is purely informational (e.g., a notification stating your favorite team has scored a goal), and others are intended to invoke an action from the user (e.g., a notification of an incoming text message that may require a reply). Some examples of these actions may include a textual reply in response to a question or a "like" indication in response to a statement. In many cases, a user receives the notification and responds with an action immediately. In other cases, the user may delay the action and ultimately, without anything to remind them, forget to perform the action.

SUMMARY

In general, aspects of the present invention provide an approach for processing a notification on a mobile device. In an embodiment, a set of classifications is assigned to a notification received by a user on a mobile device. An expected response action and an expected response time specific to the user is derived based on a comparison of the set of classifications assigned to the notification with a set of prior response profiles in a notification tracking repository. If the user does not perform a response action within the expected response time, the notification is reissued to the user.

One aspect of the invention provides a method for processing a notification on a mobile device, comprising: assigning, using a cognitive computer system, a set of classifications to a notification received by a user on a mobile device; deriving, using the cognitive computer system, a user-specific expected response action and an expected response time for the notification based on a comparison of the set of classifications assigned to the notification with a set of prior response profiles in a notification tracking repository; determining whether the response action has occurred during the expected response time; and reissuing the notification in response to a determination that the expected response action has not occurred during the expected response time.

Another aspect of the invention provides a system for processing a notification on a mobile device, comprising: a memory medium comprising instructions; a bus coupled to the memory medium; and a processor coupled to the bus that when executing the instructions causes the system to perform a method, comprising: assigning, using a cognitive computer system, a set of classifications to a notification received by a user on a mobile device; deriving, using the cognitive computer system, a user-specific expected response action and an expected response time for the notification based on a comparison of the set of classifications assigned to the notification with a set of prior response profiles in a notification tracking repository; determining whether the response action has occurred during the expected response time; and reissuing the notification in response to a determination that the expected response action has not occurred during the expected response time.

Yet another aspect of the invention provides a computer program product embodied in a computer readable medium that, when executed by a computer device, performs a method for processing a notification on a mobile device, the method comprising: assigning, using a cognitive computer system, a set of classifications to a notification received by a user on a mobile device; deriving, using the cognitive computer system, a user-specific expected response action and an expected response time for the notification based on a comparison of the set of classifications assigned to the notification with a set of prior response profiles in a notification tracking repository; determining whether the response action has occurred during the expected response time; and reissuing the notification in response to a determination that the expected response action has not occurred during the expected response time.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide an approach for processing a notification on a mobile device. In an embodiment, a set of classifications is assigned to a notification received by a user on a mobile device. An expected response action and an expected response time specific to the user is derived based on a comparison of the set of classifications assigned to the notification with a set of prior response profiles in a notification tracking repository. If the user does not perform a response action within the expected response time, the notification is reissued to the user.

Figure 1:
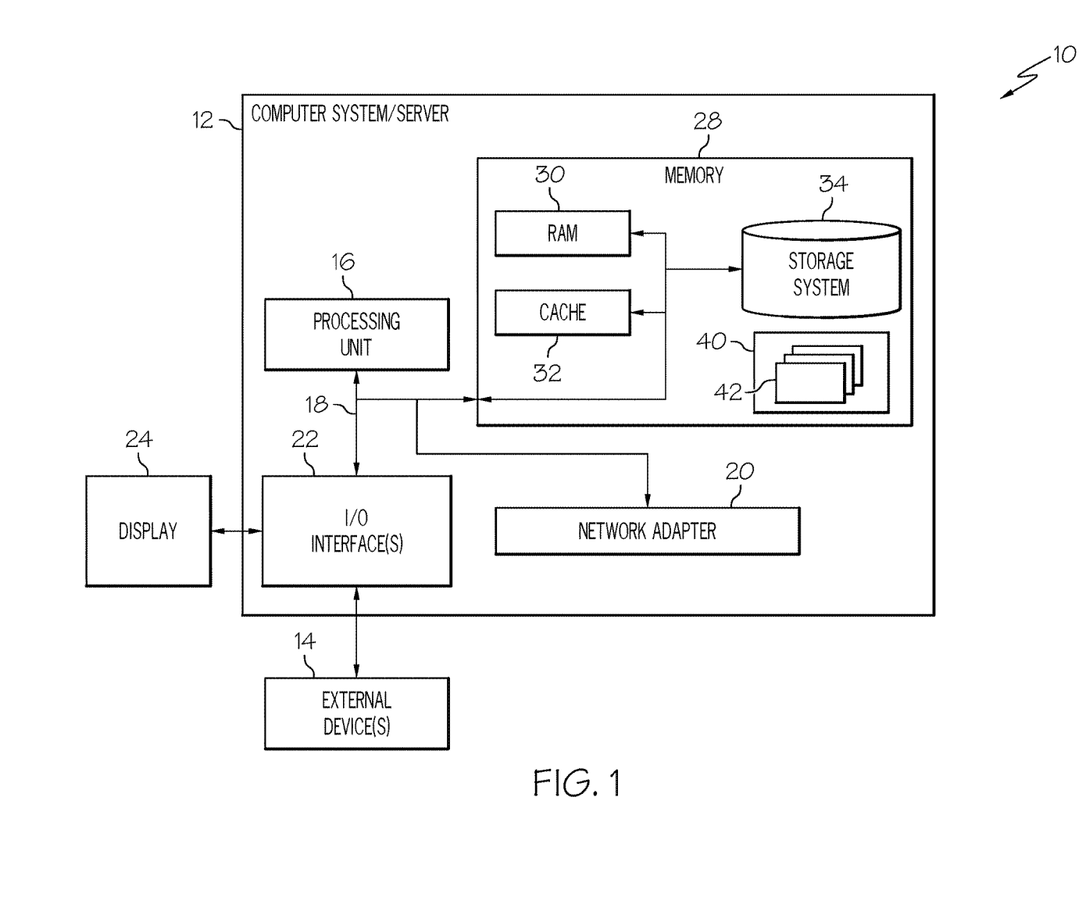
FIG. 1 depicts a data processing system according to an embodiment of the present invention.

Referring now to FIG. 1, a schematic of an example of a data processing system is shown. Data processing system 10 is only one example of a suitable data processing system and is not intended to suggest any limitation as to the scope of use or functionality of embodiments of the invention described herein. Regardless, data processing system 10 is capable of being implemented and/or performing any of the functionality set forth hereinabove.

In data processing system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in data processing system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
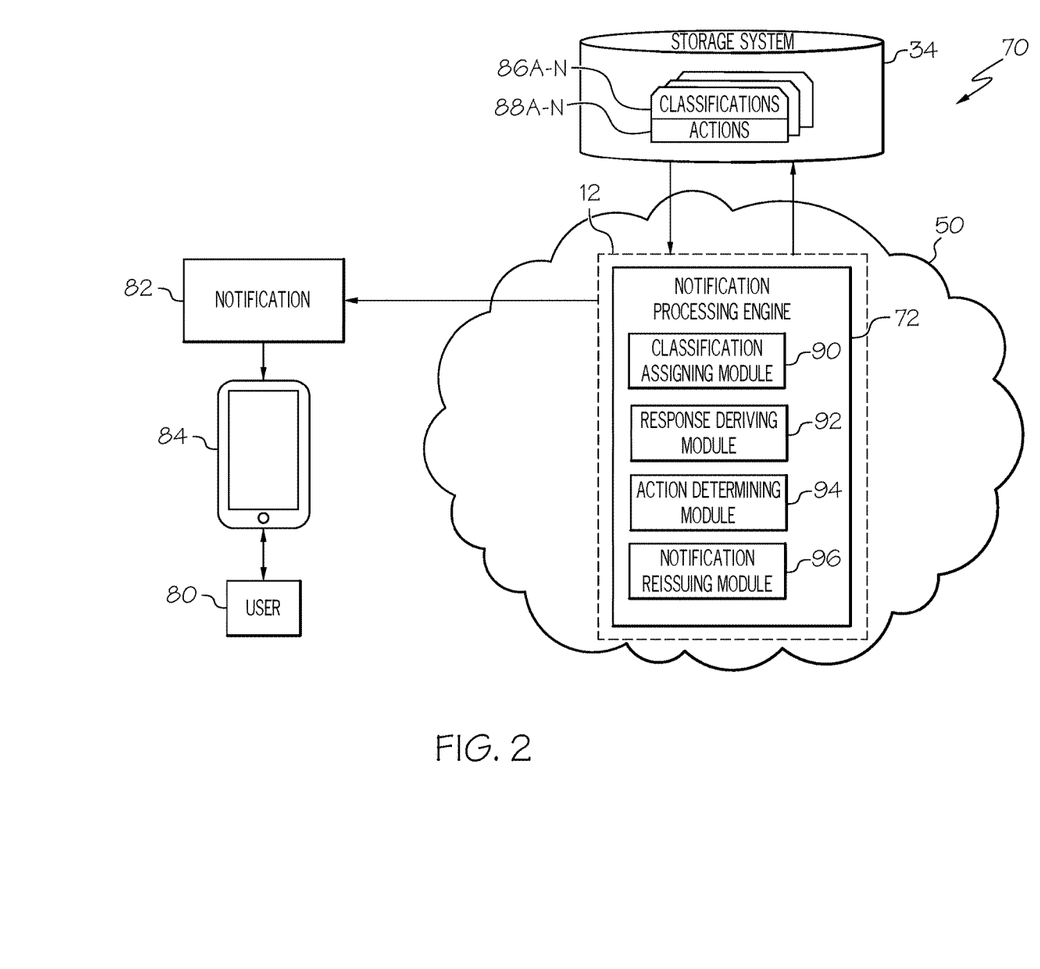
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment 70 (e.g., a cloud computing environment). A stand-alone computer system/server 12 is shown in FIG. 2 for illustrative purposes only. In the event the teachings recited herein are practiced in a networked computing environment 70, each mobile device 84 need not have a notification processing engine (hereinafter "system 72"). Rather, system 72 could be loaded on a server or server-capable device that communicates (e.g., wirelessly) with mobile device 84 to provide notification processing therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 2 for brevity purposes.

Along these lines, system 72 may perform multiple functions similar to a general-purpose computer. Specifically, among other functions, system 72 can process a notification 82 on a mobile device 84 in a networked computing environment 70. To accomplish this, system 72 can include: a classification assigning module 90, a response deriving module 92, an action determining module 94, and a notification reissuing module 96.

Figure 3:
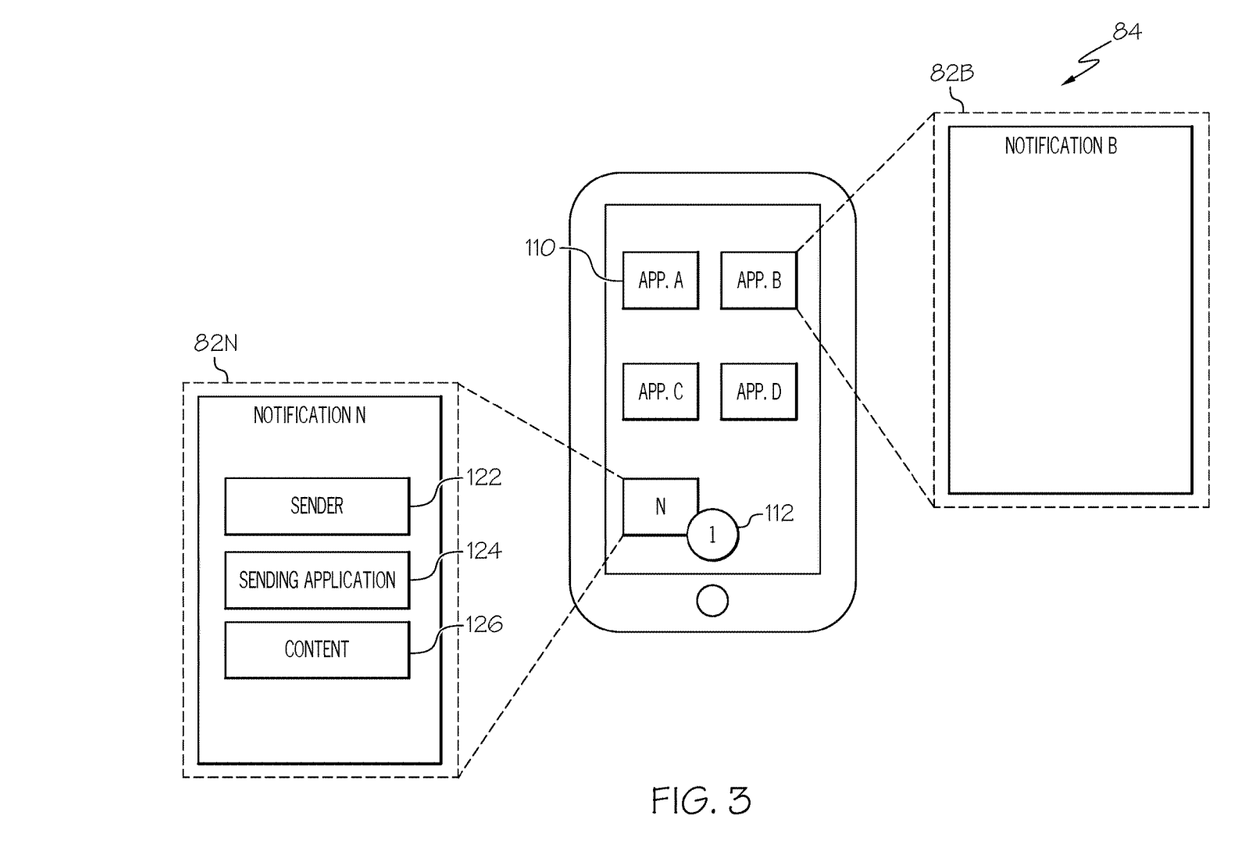
FIG. 3 depicts an example mobile device according to an embodiment of the present invention.

Referring now to FIG. 3, an example mobile device 84 is shown according to an embodiment of the invention. Mobile device 84 may be a smart phone, smart music player, smart watch, tablet, personal digital assistant, or any other device capable of receiving a notification 82B, 82N. To accomplish this task, mobile device 84 may have one or more applications 110, some or all of which (e.g., App B., App. N) are capable of receiving a notification 82B, 82N. These applications may include applications corresponding to social media websites like Facebook, Twitter, and LinkedIn (Facebook is a registered trademark of Facebook Inc., Twitter is a registered trademark of Twitter Inc., LinkedIn is a registered trademark of Linked In Corporation). Additionally, or in the alternative, these applications may include applications for processing email, short message service (SMS), and/or the like. These applications 110 may display an indicator 112 in response to the receipt of a notification 82N. Alternatively, any other solution for receiving a notification 82N on a mobile device 84 is included within the scope and spirit of the invention.

The inventors of the invention described herein have discovered certain deficiencies in the current solutions for processing a notification 82N. For example, once a notification 82N has been accessed, the indicator 112 associated with the notification 82N is usually removed by the application 110. This is usually the case whether or not an action has been taken by the user 80 (FIG. 2) in response to the notification 82N. As a result, a user 80 (FIG. 2) who wants to respond to a notification 82N but cannot or does not want to (e.g., because the user is busy, etc.) respond immediately may forget to do so later. This may cause misunderstandings or antipathy between the user 80 (FIG. 2) and the sender of the notification 82N.

Referring again to FIG. 2, classification assigning module 90 of system 72, as executed by computer system/server 12, is configured to assign a set of classifications 86A-N to notification 82 received by user 80 on a mobile device 84. In order to do this, notification 82 is analyzed in order to determine specific characteristics of the notification 82. These characteristics could include a sender 122 (FIG. 3) of the notification 82. These characteristics could further include a sending application 124 (FIG. 3) used to send the notification. Still further, these characteristics could include information contained in the informational content 126 (FIG. 3) of the notification 82. In any case, the set of classifications 86A-N can be assigned using a cognitive computer system (e.g., IBM's Watson Analytics or Watson Personality Insights (Watson and IBM are trademarks of International Business Machines Corporation)) or using any other solution.

Figure 4:
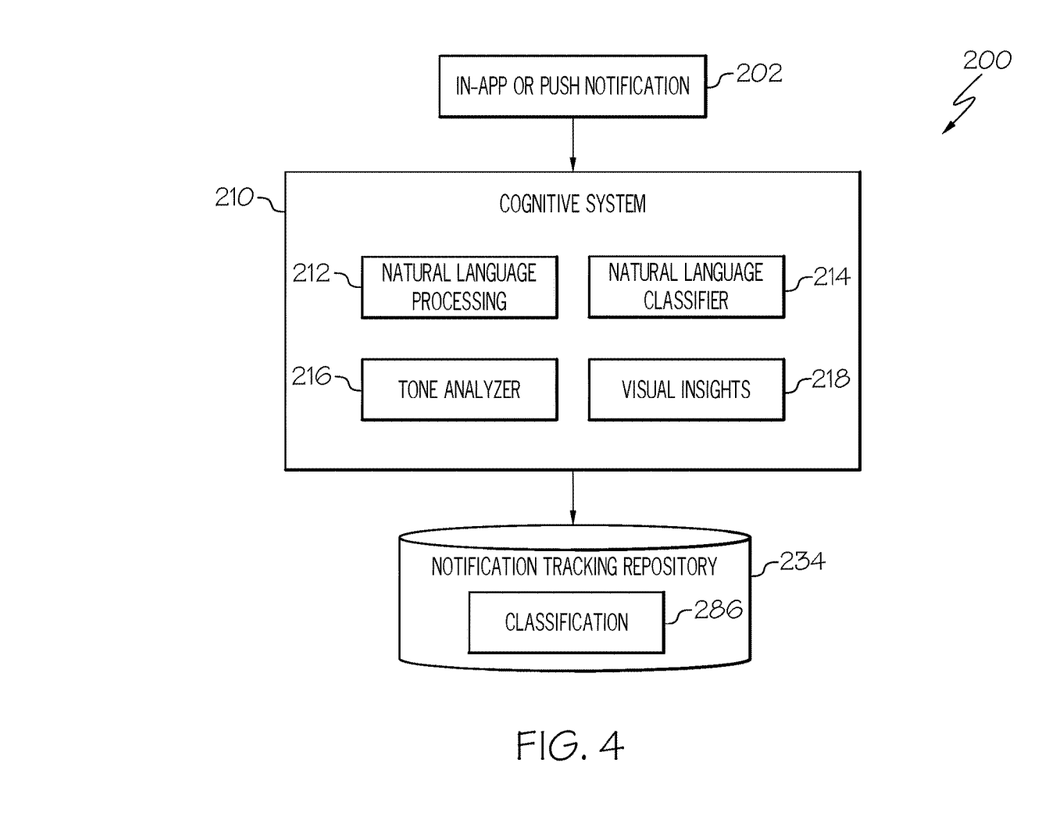
FIG. 4 depicts an example data flow diagram according to an embodiment of the present invention.

Referring now to FIG. 4, an example data flow diagram 200 is shown according to embodiments of the invention. As shown in data flow diagram 200, in conjunction with FIG. 2, an in-app or push notification 202 (hereafter notification 202) that has been received by user 80 on mobile device 84 is forwarded to a cognitive system 210. This forwarding can be performed in response to the receipt of notification 202 on mobile device 84. Additionally or in the alternative, this forwarding can be performed in response to an action taken by user 80 with respect to notification 202 (e.g., opening, viewing, etc.) without performing a response action.

In any case, in order to assign a set of classifications 86A-N to notification 202, cognitive system 210 can utilize one or more of the following: natural language processing 212, natural language classifier 214, tone analyzer 216, and/or visual insights 218. Natural language processing 212 is used to break down the keywords that indicate the meaning of the notification. For example, a notification 82 (e.g., a tweet) containing the text "thanks for following me" and "thx for the follow" can be derived to mean the same thing. Natural language classifier 214 classifies messages into a set of classes, such as events, news, and opinions. For example, using natural language classifier 214, cognitive system 210 can determine if a notification 82 is a question, a comment, or a piece of news based on the punctuation, tone, context, source, historical similarity, and/or the like.

Tone analyzer 216 analyzes notification 82 to determine its emotion, language style, and social tendencies. For example, using tone analyzer 216, cognitive system 210 can determine if the content 126 (FIG. 3) of notification 82 represents an angry emotion or tentative language style. Visual insights 218 analyzes pictures in notification 82 to classify what is shown in the picture. For example, for a notification 82 containing a picture, cognitive system 210 can use visual insights 218 (e.g., known landmarks, metadata, historical data, and/or the like) to determine what or who is pictured.

In any case, using these tools and/or others, cognitive system 210 can assign one or more classifications 286 to notification 82. Once assigned, these classifications 286 can be stored in a notification tracking repository 234 (e.g., in storage system 34).

Referring again to FIG. 2, response deriving module 92 of system 72, as executed on computer system/server 12, is configured to derive an expected response action 88A-N and an expected response time for the notification 82 that is specific to the user 80. This derivation can be done using cognitive system 210 (FIG. 4) and is performed based on a comparison of the set of classifications 286 assigned to the notification 82 with a set of prior response profiles in notification tracking repository 234.

Figure 5:
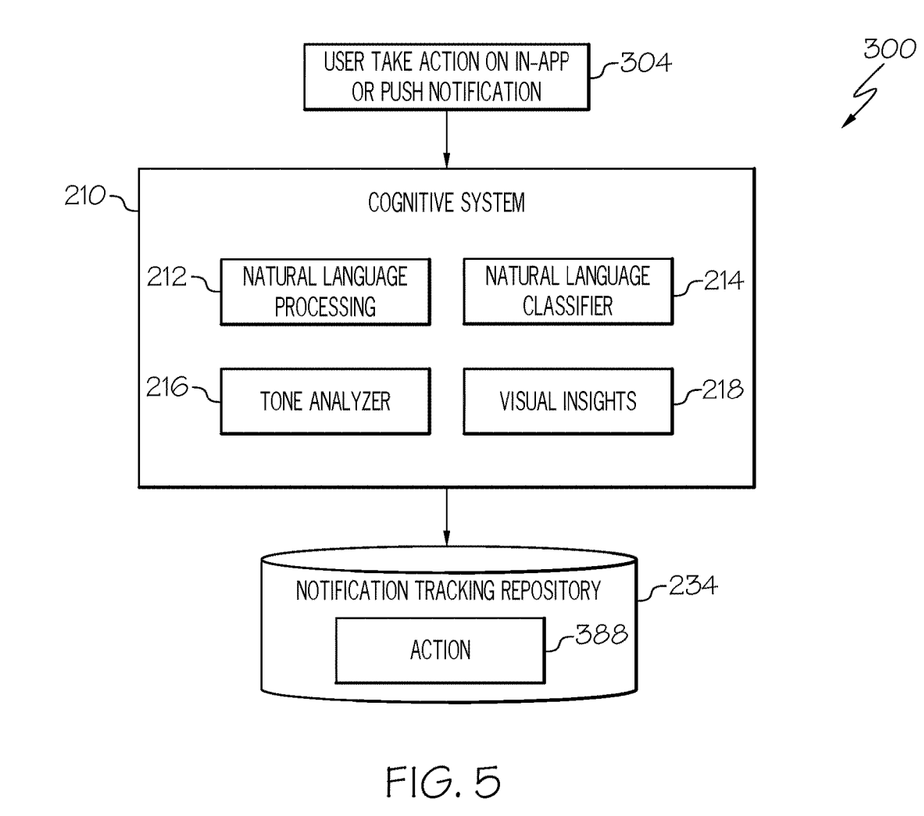
FIG. 5 depicts an example data flow diagram according to an embodiment of the present invention.

Referring now to FIG. 5, an example data flow diagram 300 for forming notification tracking repository 234 is shown according to embodiments of the invention. As shown in data flow diagram 300, in conjunction with FIG. 2, an action taken by user 80 to in-app or push notification 304 (hereafter action 304) is forwarded to cognitive system 210. This action 304 can be one of a plurality of responses by user 80 to prior notifications 82. To this extent, each action 304 can be forwarded to cognitive system 210 as it is made by user 80 or, alternatively, multiple actions 304 previously made by user 80 can be stored and forwarded to cognitive system 210 in a batch.

In any case, the action 304 that is forwarded to cognitive system 210 may be immediate (e.g., the user responds directly to the notification 82) or may be delayed (the user launches the Twitter app a day later, goes to the notification tab, selects the notification 82 and responds to it). As with the assigning of the set of classifications to the notification 202 (FIG. 4), the prior notification 82 associated with the action 304 performed by the user may be analyzed by cognitive system 210. This analysis can include the sender 122 and sending application 124 (FIG. 3) of the notification 82. Additionally, cognitive system 210 can analyze the notification using the natural language processing 212, natural language classifier 214, tone analyzer 216, and/or visual insights 218 described above.

Then the classification 286 of the prior notification 82 can be stored in notification tracking repository 234 along with the corresponding action 388. There can be multiples types of action. For example, a simple action can be defined as a basic action such as clicking a "Like" or "Retweet" button and does not require further analysis by cognitive system 210. In contrast, an advanced action (e.g., an action that involves more than a button press, such as replying to a tweet) may require analysis by cognitive system 210, which may use the same techniques as described above. The resultant action 388 can be stored in notification tracking repository 234, along with the time (e.g., delay) it took the user to perform the action.

Response deriving module 92 uses these classifications 286 and actions 388 in notification tracking repository 234 to derive the expected action and expected response time for the user. In an embodiment, the classifications 286 assigned to the notifications 202 of the user 80 by cognitive system 210 are obtained. These notifications are then grouped by cognitive system 210 based on classification 286 assigned to the notification 82 using any solution. Then, a prior response profile for the assigned classification is created by cognitive system 210 based on the grouping. Finally, the expected response action and the expected response time are generated for the prior response profile based on the actions 388 corresponding to the notifications 82 in the assigned classification. Additionally, a confidence level may be associated with the expected response action and the expected response time in the prior response profile.

The classification(s) of the received notification 82 is compared to the response profiles to yield an expected response and expected response time that best reflects what is expected for the notification, and, optionally, a confidence level. For example, assume that user 80 receives notification of a tweet demonstrating urgent emotion and @mentioning the user. In the example, based on previous actions taken by the user 80, the system can predict the following: predicted action—user will reply to the tweet with a textual response; expected response time—0.1 minutes to 1 hour; and confidence level—0.86. Alternatively, assume that user 80 receives notification of a SMS message that does not demonstrate urgent emotion but asks a question. Based on previous actions taken by the user 80, the system can predict the following: predicted action—user will reply to the SMS message with a textual response; expected response time—0.1 minutes to 2 hours; and confidence level—0.91. Alternatively, assume that user 80 receives notification of a reply to a social media post originally made by user. Based on previous actions taken by the user 80, the system can predict the following: predicted action—user will reply to the post with a "Like" indication; expected response time—0.1 minutes to 1.5 hours; and confidence level—0.72.

Referring again to FIG. 2, action determine module 94 of system 72, as executed on computer system/server 12, is configured to determine whether the user 80 has performed an action in response to the notification 82 within the expected response time. The system continues to monitor activity, looking for the user 80 to complete the action predicted by response deriving module 92 in response to the received notification 80. If user 80 performs a response action within this time, there is no need to reissue the notification 82 and the response action and response time can be analyzed by cognitive system 210 and recorded in notification tracking repository 234 in order to improve the deriving of expected response actions and expected response times for future notifications 82.

Notification reissuing module 96 of system 72, as executed on computer system/server 12, is configured to reissue notification 82 in response to a determination by action determining module 94 that the expected response action has not occurred within the expected response time. In an embodiment, for predicted actions with a sufficiently high confidence level, if a predicted action is not taken within the predicted time frame notification, reissuing module 96 can reissue the notification 82 to attract the user's 80 attention. Optionally, notification reissuing module 96 can provide insight data alongside the notification. For example, referring again to the example above in which an urgent tweet was received, notification reissuing module 96 may reissue the notification 82 together with the statement: "You typically reply to tweets like this within 1 hour (86% confidence level)". If user 80 performs a response action, the response action and response time can be analyzed by cognitive system 210 and recorded in notification tracking repository 234 in order to improve the deriving of expected response actions and expected response times for future notifications 82. Further, if user 80 does not perform a response action, this fact can also be analyzed by cognitive system 210 and recorded in notification tracking repository 234 in order to improve the deriving of expected response actions and expected response times for future notifications 82.

Figure 6:
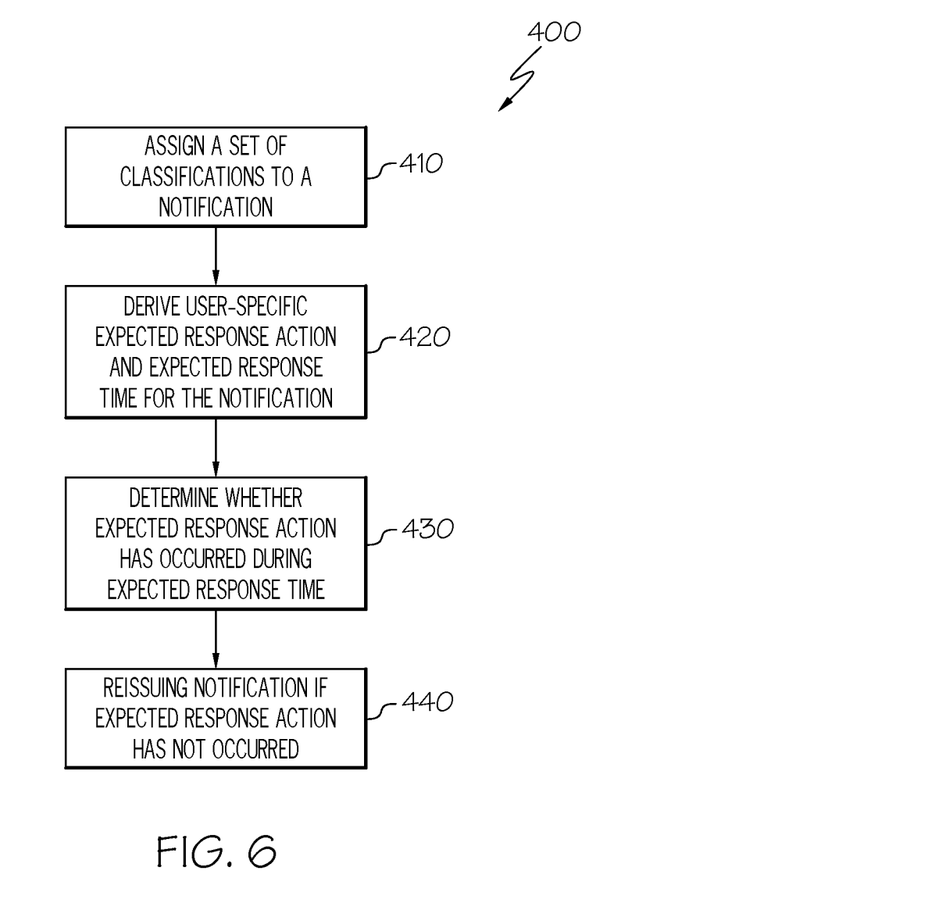
FIG. 6 depicts an example process flowchart according to an embodiment of the present invention.

Referring now to FIG. 6 in conjunction with FIG. 2, a process flowchart 400 according to an embodiment of the present invention is shown. At 410, classification assigning module 90 of system 72, as executed by computer system/ server 12, uses cognitive system 210 (FIG. 4) to assign a set of classifications 286 to notification 82 received by user 80 on mobile device 84. At 420, response deriving module 92, as executed by computer system/server 12, uses cognitive system 210 (FIG. 4) to derive a user-specific expected response action and an expected response time for the notification 82. This derivation is based on a comparison of the set of classifications assigned to notification 82 with a set of prior response profiles in notification tracking repository 234 (FIG. 4). At 430, action determining module 94, as executed by computer system/server 12, determines whether the response action has occurred during the expected response time. Finally, at 440, notification reissuing module, as executed by computer system/server 12, reissues notification 82 to user 80 in response to a negative determination in 430.

The process flowchart of FIG. 6 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for processing a notification on a mobile device, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for processing a notification on a mobile device. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for processing a notification on a mobile device. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, system 72 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission medial (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for processing a notification on a mobile device. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for processing a notification on a mobile device, comprising:
   assigning, using a cognitive computer system, a set of classifications to a notification received by a user on a mobile device;
   obtaining, by the cognitive computer system, for each prior notification of a plurality of prior notifications received by a user, a set of assigned classifications;
   grouping, by the cognitive computer system, the plurality of prior notifications corresponding to an assigned classification;
   creating, by the cognitive computer system, a prior response profile for the assigned classification based on the grouping;
   deriving, using the cognitive computer system, a user-specific expected response action and an expected response time for the notification based on a comparison of the set of classifications assigned to the notification with a set of prior response profiles in a notification tracking repository by generating the expected response action and the expected response time for the prior response profile based on a prior response action and a prior response time corresponding to each prior notification in the assigned classification;

determining whether the response action has occurred during the expected response time; and reissuing the notification in response to a determination that the expected response action has not occurred during the expected response time.

2. The method of claim 1, further comprising computing a confidence level associated with the expected response action and the expected response time in the prior response profile.

3. The method of claim 1, further comprising:

recording a user response action in response to the reissuing; and updating the prior response profile based on the user response action.

4. The method of claim 1, the assigning of the set of classifications further comprising:

performing natural language processing to determine a meaning of language included in the notification;

determining a type of communication included in the notification;

analyzing a tone of the communication; and determining a subject matter of any image data in the notification.

5. The method of claim 4, wherein the set of classifications is further assigned based on an application on which the notification was received and a person from which the notification was received.

6. The method of claim 1, the reissuing further comprising providing the expected action with the notification.

7. A system for processing a notification on a mobile device, comprising:

a memory medium comprising instructions;

a bus coupled to the memory medium; and a processor coupled to the bus that when executing the instructions causes the system to perform a method, comprising:

assigning, using a cognitive computer system, a set of classifications to a notification received by a user on a mobile device;

obtaining, by the cognitive computer system, for each prior notification of a plurality of prior notifications received by a user, a set of assigned classifications;

grouping, by the cognitive computer system, the plurality of prior notifications corresponding to an assigned classification;

creating, by the cognitive computer system, a prior response profile for the assigned classification based on the grouping;

deriving, using the cognitive computer system, a user-specific expected response action and an expected response time for the notification based on a comparison of the set of classifications assigned to the notification with a set of prior response profiles in a notification tracking repository by generating the expected response action and the expected response time for the prior response profile based on a prior response action and a prior response time corresponding to each prior notification in the assigned classification;

determining whether the response action has occurred during the expected response time; and reissuing the notification in response to a determination that the expected response action has not occurred during the expected response time.

8. The system of claim 7, the method further comprising computing a confidence level associated with the expected response action and the expected response time in the prior response profile.

9. The system of claim 7, the method further comprising:

recording a user response action in response to the reissuing; and updating the prior response profile based on the user response action.

10. The system of claim 7, the assigning of the set of classifications further comprising:

performing natural language processing to determine a meaning of language included in the notification;

determining a type of communication included in the notification;

analyzing a tone of the communication; and determining a subject matter of any image data in the notification.

11. The system of claim 10, wherein the set of classifications is further assigned based on an application on which the notification was received and a person from which the notification was received.

12. The system of claim 7, the reissuing further comprising providing the expected action with the notification.

13. A computer program product embodied in a computer readable storage device that, when executed by a computer device, performs a method for processing a notification on a mobile device, the method comprising:

assigning, using a cognitive computer system, a set of classifications to a notification received by a user on a mobile device;

obtaining, by the cognitive computer system, for each prior notification of a plurality of prior notifications received by a user, a set of assigned classifications;

grouping, by the cognitive computer system, the plurality of prior notifications corresponding to an assigned classification;

creating, by the cognitive computer system, a prior response profile for the assigned classification based on the grouping;

deriving, using the cognitive computer system, a user-specific expected response action and an expected response time for the notification based on a comparison of the set of classifications assigned to the notification with a set of prior response profiles in a notification tracking repository by generating the expected response time, and a confidence level for the prior response profile based on a prior response action and a prior response time corresponding to each prior notification in the assigned classification;

determining whether the response action has occurred during the expected response time; and reissuing the notification in response to a determination that the expected response action has not occurred during the expected response time.

14. The program computer product of claim 13, the method further comprising:

recording a user response action in response to the reissuing; and updating the prior response profile based on the user response action.

15. The computer program product of claim 13, the assigning of the set of classifications further comprising:

performing natural language processing to determine a meaning of language included in the notification;

determining a type of communication included in the notification;

analyzing a tone of the communication; and determining a subject matter of any image data in the notification.

16. The computer program product of claim 15, wherein the set of classifications is further assigned based on an application on which the notification was received and a person from which the notification was received.

17. The computer program product of claim 13, the reissuing further comprising providing the expected action with the notification.

* * * * *